US009815163B2

(12) United States Patent
Moore

(10) Patent No.: US 9,815,163 B2
(45) Date of Patent: Nov. 14, 2017

(54) INTERACTIVE TOOLS

(71) Applicant: Jason L Moore, Austin, TX (US)

(72) Inventor: Jason L Moore, Austin, TX (US)

( * ) Notice: Subject to any disclaimer, the term of this patent is extended or adjusted under 35 U.S.C. 154(b) by 749 days.

(21) Appl. No.: 14/269,176

(22) Filed: May 4, 2014

(65) Prior Publication Data

US 2014/0238713 A1 Aug. 28, 2014

Related U.S. Application Data

(62) Division of application No. 13/101,106, filed on May 4, 2011, now Pat. No. 8,763,720.

(60) Provisional application No. 61/345,621, filed on May 18, 2010.

(51) Int. Cl.

| | |
|---|---|
| ***B23Q 17/22*** | (2006.01) |
| ***B23Q 17/00*** | (2006.01) |
| ***B25F 5/00*** | (2006.01) |

(52) U.S. Cl.

CPC .............. *B23Q 17/007* (2013.01); *B25F 5/00* (2013.01)

(58) Field of Classification Search

CPC ............................ B23Q 17/007; Y10T 408/21

See application file for complete search history.

(56) References Cited

U.S. PATENT DOCUMENTS

| | | | | |
|---|---|---|---|---|
| 5,010,652 A * | 4/1991 | Miletich | B23D 49/167 | 30/393 |
| 5,484,026 A * | 1/1996 | Susaki | B25B 21/00 | 173/11 |
| 5,562,240 A * | 10/1996 | Campbell | B25C 1/04 | 173/20 |
| 6,692,200 B2 * | 2/2004 | Peterson | B25H 1/0092 | 362/119 |
| 6,763,597 B2 * | 7/2004 | Lysen | G01B 11/272 | 33/227 |
| 6,878,954 B2 * | 4/2005 | Butler | B23D 59/002 | 250/559.29 |
| 7,359,762 B2 * | 4/2008 | Etter | G05B 19/409 | 700/160 |
| 7,506,453 B2 * | 3/2009 | Houston | G01C 9/06 | 33/334 |
| 8,004,664 B2 * | 8/2011 | Etter | B23B 25/06 | 356/139.01 |
| 2006/0102682 A1 * | 5/2006 | Etter | B23B 25/06 | 227/2 |
| 2006/0208577 A1 * | 9/2006 | Richter | B25F 5/00 | 307/326 |
| 2009/0025233 A1 * | 1/2009 | Kaiser | B23D 49/167 | 30/392 |
| 2009/0028652 A1 * | 1/2009 | Yamamoto | B23B 49/00 | 408/6 |

* cited by examiner

*Primary Examiner* — Andrew M Tecco

(57) ABSTRACT

A method includes receiving a first alignment state indication at a portable handheld tool from an alignment tool. The first alignment state indication indicating an alignment state of a workpiece relative to a reference that is independent and distinct from the portable handheld tool. The method also includes, based on the first alignment state indication, enabling a first selectable drive state of a drive system of the portable handheld tool. The method further includes actuating the drive system responsive to user input, where the drive system is limited based, on the first selectable drive state.

20 Claims, 7 Drawing Sheets

INTERACTIVE TOOLS

CLAIM OF PRIORITY

The present application is a divisional application of and claims priority to U.S. patent application Ser. No. 13/101,106 entitled "Interactive Tools" filed May 4, 2011, which claims priority to U.S. Provisional Patent Application No. 61/345,621, entitled "Interactive Tools" filed May 18, 2010, the entire contents of each of which is incorporated herein by reference in its entirety for all purposes.

FIELD OF THE DISCLOSURE

The present disclosure is generally related to interactive tools.

BACKGROUND

Certain tasks can be difficult to perform well without assistance. For example, tasks in which a measurement is to be taken while another operation is performed. To illustrate, when a fastener must be fastened while a measurement of location or position is taken to ensure proper placement of work piece. Even with assistance, such tasks can be difficult.

SUMMARY

In a particular embodiment, an interactive tool set includes a portable handheld tool and an alignment tool. The portable handheld tool includes a selective drive system. When the selective drive system is engaged, the portable handheld tool is operable perform a function and, when the selective drive system is not engaged, the portable handheld tool is not operable to perform the function. The alignment tool is physically separate and distinct from the portable handheld tool. The selective drive system engages in response to an indication of an aligned state of the alignment tool.

In another particular embodiment, an interactive tool set includes a portable handheld tool and an alignment tool. The portable handheld tool includes a selective drive system. When the selective drive system is engaged, the portable handheld tool is operable to perform a function and, when the selective drive system is not engaged, the portable handheld tool is not operable to perform the function. The alignment tool is physically separate and distinct from the portable handheld tool. The selective drive system engages in response to an indication of an aligned state of a portion of the portable handheld tool and a portion of the alignment tool.

In a particular embodiment, a portable handheld tool includes a drive head and a selective drive system coupled to the drive head. The selective drive system has a plurality of engagement states. When the selective drive system is in a first engagement state, the drive head is operable to perform a function in response to a user input. When the selective drive system is in a second engagement state, the drive head is not operable to perform, the function in response to the riser input. The portable handheld tool also includes an alignment receiver coupled to the selective drive system. The alignment receiver selects the engagement state of the selective drive system based on an alignment state related to a physically separate and distinct alignment tool.

DETAILED DESCRIPTION

Figure 1:
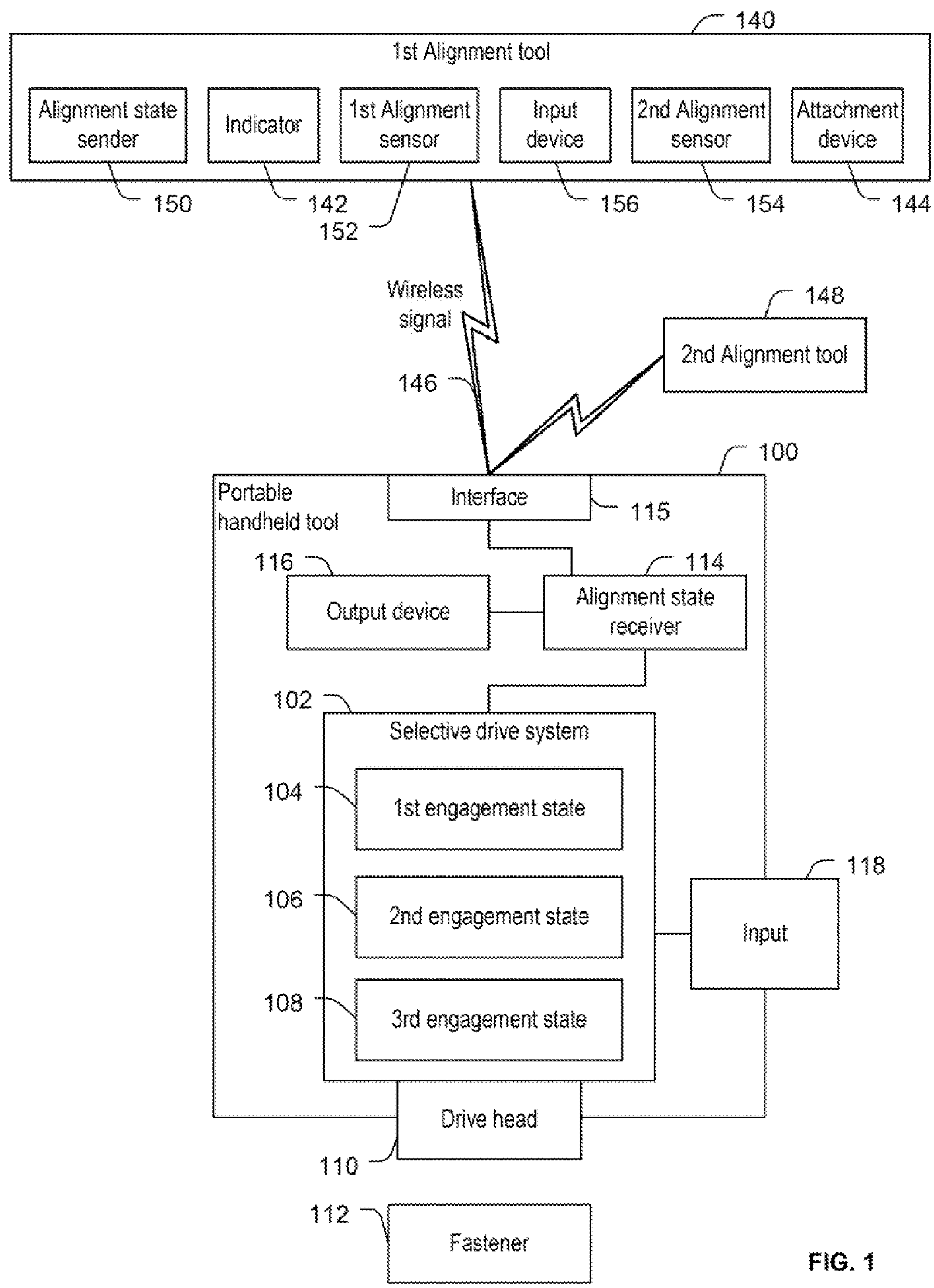
FIG. 1 is a block diagram of a first particular embodiment of an interactive tool set.

FIG. 1 is a block diagram of a first particular embodiment of an interactive tool set. The interactive tool set includes a portable handheld tool 100 and at least one alignment tool, such as a first alignment tool 140, a second alignment tool 148, or both, in a particular embodiment, the one or more alignment tools 140, 148 are physically separate and distinct from the portable handheld tool 100.

The portable handheld tool 100 may include a power tool or a hand tool (i.e., a tool that is not power driven). To illustrate, the portable handheld tool 100 may include a wrench, a ratchet, a torque wrench or another portable handheld tool, that has a drive head 110. The drive head 110 may be adapted to drive a fastener 112. The fastener 112 may include a nail, a screw, a rivet, a staple, a bolt, a nut, or another fastener. The portable handheld tool 100 may include an input 118 that is operable by a user to activate the drive head 110 to cause the fastener 112 to be driven. For example, the input 118 may include a trigger, one or more buttons, one or more switches, a keypad, another device used to activate the drive head 110, or any combination thereof. In some embodiments, no input 118 is present; rather, the portable handheld tool 100 may operate by default or automatically. For example, a handheld wrench may operate to tighten a nut or bolt without use of a button, a trigger or another input 118. Similarly, a torque wrench may operate to tighten a nut or bolt until a particular torque setting is achieved, then the torque wrench may cease to function to further tighten the nut or bolt, again without an input 118.

The portable handheld tool 100 may include a selective drive system 102. The selective drive system 102 may include an electronic system (e.g., an application specific circuit or a processor that executes software) or a mechanical system (e.g., a transmission, a clutch, a cam, etc.), or a combination thereof, that is operable to select an engagement state of the drive head 110. For example, when the selective drive system 102 is engaged, the portable handheld tool 100 is operable perform a function (i.e., the selective drive system 102 is responsive to user input via the input 118). When the selective drive system 102 is not engaged, the portable handheld tool 100 is not operable to perform the function (i.e., the selective drive system 102 is not responsive to user input via the input 118).

To illustrate, the selective drive system 102 may have a plurality of selectable engagement states, such as a first engagement state 104, a second engagement state 106 and a third engagement state 108. When the selective drive system 102 is in the first engagement system 104, the portable handheld tool 100 may not operate. Thus, the first engagement state 104 may be a locked, safe or disarmed state. When the selective drive system 102 is in the second engagement state 106, the portable handheld tool 100 may be operable to at least partially drive the fastener. For example, the second engagement state 106 may include a torque setting that is sufficient to partially drive the fastener 112 but is not sufficient to cause complete engagement of the fastener 112. When the selective drive system 102 is in the third engagement state 108, the portable handheld tool 100 may be operable to fully drive the fastener 112. For example, the third engagement state 108 may include a torque setting that is sufficient to cause complete engagement of the fastener 112.

In a particular embodiment, the selective drive system 102 engages or selects an engagement state in response to indication of an aligned state of one or more of the alignment tools 140, 148. The selective drive system 102 may include two or more engaged drive settings or engagement states. For example, the selective drive system 102 may engage a first drive setting when the aligned state is not indicated and may engage at the second drive setting when the aligned state is indicated.

For example, the first drive setting may enable partial driving of a fastener while a work piece is adjusted to move the one or more alignment tools 140, 148 into the aligned state. To illustrate, when the selective drive system 102 is in the first drive setting (e.g., the second engagement state 106), the portable handheld tool 100 may be operable up to a first torque threshold, and when the second drive setting is engaged (e.g., the third engagement state 108), the portable handheld tool 100 may be operable to a second torque threshold. The second torque threshold may be higher than the first torque threshold. Thus, a user may be able to partially drive the fastener (e.g., to drive the fastener a first threshold amount or to a first threshold degree), but not completely secure the fastener 112 (e.g., a second threshold amount or a second threshold degree) while the aligned state is not indicated by the one or more alignment tools 140, 148. Since the fastener 112 is not completely secured, the user may be able to move the work piece that is partially held by the fastener 112 until the aligned state is indicated before completely securing the fastener 112. When the work piece is moved sufficiently to cause the aligned state to be indicated, the selective drive system 102 may select the second drive setting (e.g., the third engagement state 108) to enable fully securing the fastener 112.

In another example, when the first drive setting is engaged, the portable handheld tool 100 is operable up to a first maximum rate (e.g., a first maximum rotation rate), and when the second drive setting is engaged, the portable handheld tool 100 is operable to second maximum rate (e.g., a second maximum rotation rate). The second maximum rate may be higher than the first maximum rate. Thus, the portable handheld tool 100 may operate at a partial capacity until the aligned state is indicated.

In another example, the selective drive system 102 includes two or more engaged drive settings. The selective drive system 102 engages a first drive setting when a first alignment state is indicated and engages at a second drive setting when a second alignment state is indicated. To illustrate, the first alignment tool 140 may be a level measurement device that indicates a first aligned state when an associated work piece is nearly level (e.g., less than 10 degrees out of level, less than 5 degrees out of level, or less than some other adjustable or fixed threshold angle from level). The selective drive system 102 may select the first drive setting when the first aligned state is indicated. The first alignment tool 140 may indicate a second aligned state when the associated work piece is level to within an error margin (e.g., level within measurement error or level to within an acceptable error margin that may be predetermined or user selectable). The selective drive system 102 may select the second drive setting when the second aligned state is indicated.

In still other examples, when neither the first nor the second alignment tools 140, 148 indicate the aligned state, the selective drive system 102 may select the first engagement state 104 (e.g., the locked, safe or disarmed state). When the first alignment tool 140 indicates the aligned state and the second alignment tool 148 does not indicate the aligned state, the selective drive system 102 may select the second engagement state 106 (e.g., to partially drive the fastener). When the first alignment tool 140 indicates the aligned state and the second alignment tool 148 indicates the aligned state, the selective drive system 102 may select the third engagement state 108 (e.g., to fully drive the fastener 112). In another example, when neither the first nor the second alignment tools 140, 148 indicate the aligned state, the selective drive system 102 may select the second engagement state 106 to enable partially driving of the fastener 112, but not complete tightening of the fastener 112.

In some embodiments, only one alignment tool, such as the first alignment tool 140 or the second alignment tool 148 may be present. In other embodiments, more than two alignment tools may be present, such as three, four or more. Additionally, while the examples listed above illustrate interaction of the portable handheld tool 100 with one or two alignment tools 140, 148, in certain embodiments, the portable handheld tool 100 may interact with more than two alignment tools. Further, when the portable handheld tool 100 is used with more than two alignment tools, the selective drive system 102 may be configured to select the engagement state based on all of the alignment tools or based on a subset of the alignment tools. To illustrate, when the portable handheld tool 100 is used with three alignment tools, the selective drive system 102 may select the engagement state based on the aligned state of any combination of the three alignment tools. For example, the first engagement state 104 may be selected when only one of the three alignment tools indicates the aligned state, the second engagement state 106 may be selected when two of the three alignment tools indicate the aligned state, and the third engagement state 108 may be selected when all three or the alignment tools indicate the aligned state. Similarly, when the portable handheld tool 100 is used with four or more alignment tools, the selective drive system 102 may select the engagement state based on any combination of the four or more alignment tools. Additionally, in particular embodiments, the selective drive system 102 may include more than or fewer than three engagement states. The particular combination of alignment states used to selected the engagement state may be user selectable.

In a first illustrative example, the first alignment tool 140 may include a level measurement device. In this example, the aligned state may be indicated when the level measurement device is substantially level. It is understood that the alignment tools 140, 148 may indicate the aligned state when a measurement is within a predetermined or configurable threshold. In a second illustrative example, the alignment tool 140 may include a length measurement device. In this example, the aligned state may be indicated when the length measurement device is substantially at a predetermined location or indicates that a predetermined length has been measured. In a third illustrative example, the first, alignment tool 140 includes an angle measurement device. In this example, the aligned, state may be indicated when the angle measurement device indicates a specified angle. The second alignment tool 148 (and any other alignment tool that may be present) may be the same as the first alignment tool 140 or different than the first alignment tool 140. For example, when the first alignment tool 140 is a level measurement device, the second alignment tool 148 may also be a level measurement device or may be a different type of device, such as a length measurement device.

The portable handheld tool 100 may include a power tool, such as a drill/driver device, a hammering device, etc. Additionally, or in the alternative, the portable handheld tool 100 may include a non-powered tool, such as a hand tool (e.g., a wrench, a ratchet, a torque wrench, etc.). Additionally, when the portable handheld tool 100 includes a power tool, the power tool may be electric (e.g., via a power cord or onboard battery), pneumatic, hydraulic, or powered by some other source, such as a chemical reaction (e.g., an explosive reaction such as may be used to drive a cordless nailer, or a combustion reaction such as may be used for a torch or a gas welder).

The aligned state may be indicated via a wireless signal 146 sent by the alignment tool 140. For example, the alignment tool 140 may include an alignment state sender 150 that sends the wireless signal 146, which may be detected by an alignment state receiver 114 of the portable handheld tool 100 via an interface 115. The wireless signal 146 may include a signal indicating the aligned state of the alignment tool 140. For example, the wireless signal 14 may indicate a value of a measurement performed by the alignment tool 140. In this example, the portable handheld tool 100 may determine whether the value satisfies a particular alignment threshold in order to select an engagement state. In another example, the wireless signal 146 may indicate that a particular alignment state is satisfied (i.e., the alignment tool may compare a measured valued to the particular alignment threshold and indicate only that the particular alignment threshold is satisfied). The wireless signal 146 may be a radio frequency signal (e.g., Bluetooth, ZigBee, etc.), a light-based signal (e.g., a laser signal or an infrared signal), a sound, or another signal. When the aligned state is sent via a sound, the sound may be human audible or outside the human hearing range. To illustrate, an audible tone may be generated to indicate the aligned state or to indicate a non-aligned state. For example, the alignment device may generate an audible tone when the alignment state is indicated. Thus, the signal may include a human audible tone that indicates the aligned state to the portable handheld tool 100 and that indicates to the user that the selective drive system 102 is engaged.

In a particular embodiment, the portable handheld tool 100 includes at least one output device 116. The at least one output device 116 may provide output indicating the aligned state of the alignment tool 140. The at least one output device 116 may provide output indicating an engagement state of the selective drive system 102. The output device 116 may include a light, a speaker, a display, or another visible, audible or haptic (e.g., vibrating) output device.

In a particular embodiment, the one or more alignment tools 140, 148, the portable handheld tool 100, or any combination thereof may include an attachment device 144 to enable hands free operation. The attachment device 144 may include a magnet, a suction cup, a pin, a hook and loop fastener, a reusable adhesive surface, another attachment device, or any combination thereof.

The one or more alignment tools 140, 148 may each include one or more alignment sensors. For example, the first alignment tool 140 may include a first alignment sensor 152 and a second alignment sensor 154. The first alignment sensor 152 and the second alignment sensor 154 may of the same time or of different types. For example, the first alignment sensor 152 may be a level sensor and the second alignment sensor 154 may be another level sensor, a distance or length sensor, or another type of sensor.

The alignment tools 140, 148 may also include an input device 156. For example, the input device 156 may receive input from the user to select one or more of the alignment sensors 152, 154 to be an active alignment sensor. To illustrate, the input device 156 may include a switch, a button, or another selector to select the particular alignment sensor or sensors 152, 154 that are to be used to determine whether the first alignment tool 140 is in the aligned state. In another example, the input device 156 may be adapted to receive input specifying a condition that indicates alignment (e.g., a value of an alignment threshold). To illustrate, when the first alignment tool 140 is a length measurement device, the input device 156 may receive input from the user to indicate what length or distance is to be measured to indicate alignment.

In a particular embodiment, one or more of the alignment tools 140, 148 may include an indicator 142. The indicator 142 may indicate the aligned state, may indicate a type or degree of adjustment that is needed to bring the alignment tool 140, 148 into alignment, may indicate when the aligned state is achieved, or any combination thereof. For example, the indicator 142 may include a display that is adapted to show a distance, a direction or an amount of adjustment needed to achieve the aligned state. In another example, the indicator 142 may include one or more lights that illuminate to show a distance, a direction or an amount of adjustment needed to achieve the aligned state. In yet another example, the indicator 142 may include a speaker or other sound generation device to generate an audible indication of a distance, a direction or an amount of adjustment needed to achieve the aligned state.

Figure 2:
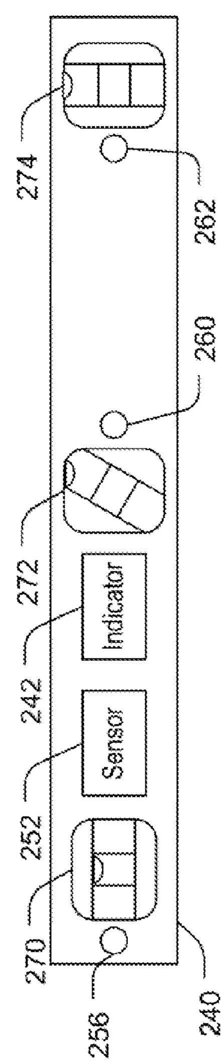
FIG. 2 is an illustration of a first example of an alignment tool.

FIG. 2 is an illustration of a first example of an alignment tool, which is a level measurement tool 240, also referred to as a "bubble level" or simply a "level". The level 240 includes a plurality of level measurement sensor, such as a first bubble vial 270, a second bubble vial 272 and a third bubble vial 274. In a particular embodiment, the level 240 includes a sensor 252 that is separate from the bubble vials 270-274. The sensor 252 may determine when one or more of the bubble vials 270-274 is in an aligned state and may provide an alignment state output such as the wireless signal 146 of FIG. 1. In another particular embodiment, each bubble vial 270-274 may include a sensor that is adapted to determine whether the level 240 is in a position that causes the particular bubble vial to be aligned (i.e., level). That is, each bubble vial 270-274 may independently send an alignment signal indicating alignment, of the bubble vial 270-274. In this embodiment, the level 240 functions similar to three separate alignment tools that are in a common housing. Thus, each bubble vial 270-274 may have an alignment state sender (such as the alignment state sender 150 of FIG. 1) an indicator (such as the indicator 142 of FIG. 1), and so forth.

Since the bubble vials 270-274 visually indicate alignment (i.e., when the bubble in a particular bubble vial 270-274 is centered between the lines, the particular bubble vial 270-274 is substantially level) no separate indicator 242 may be present. However, in certain embodiments, the separate indicator 242 may be provided, for example, to provide information to assist the user in bring the level 240 into alignment, such as a direction or amount that a work piece should be moved to bring a particular bubble vial 270-274 into alignment.

An input device 256, 260, 262 maybe associated with each bubble vial 270-274 to select one or more of the bubble vials 270-274 as an active alignment sensor. In a particular embodiment, no input device 256, 260, 262 is used to select an active bubble vial 270-274. Rather, each bubble vial 270-274 may be active and when any one of the bubble vials 270-274 is substantially level, the level 240 may generate an alignment state signal indicating that the level 240 is in the aligned state.

Figure 3:
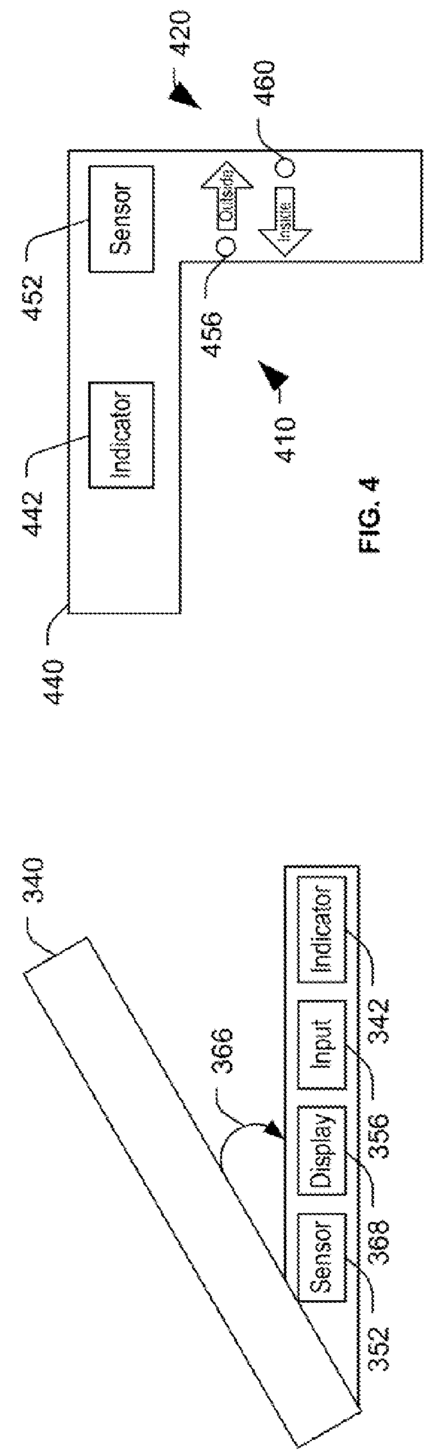
FIG. 3 is an illustration of a second example of an alignment tool.

FIG. 3 is an illustration of a second example of an alignment tool, which is an angle measurement tool 340. The angle measurement tool 340 includes a sensor 352 that is adapted to determine whether an angle 366 measured by the angle measurement tool 340 is a specified alignment angle. The angle measurement tool 340 may also include an input 356 to receive user input to specify the alignment angle. That is, the input 356 may be used to receive information specifying a particular angle that, when measured by the angle measurement tool 340, will be considered to be an indication that the angle measurement tool 340 is in the aligned state.

The angle measurement tool 340 may include a display 368, an indicator 342, or both. The display 368, the indicator 342, or both may indicate a direction or amount that a work piece should be moved to be in the aligned state. In a particular embodiment, the display 368 may indicate the alignment (i.e., the angle measurement that is to be considered the aligned state), the angle 366 that is currently measured by the angle measurement tool 340, or both. For example, the input 356 may be used in conjunction with the display 368 to specify the alignment angle.

Figure 4:
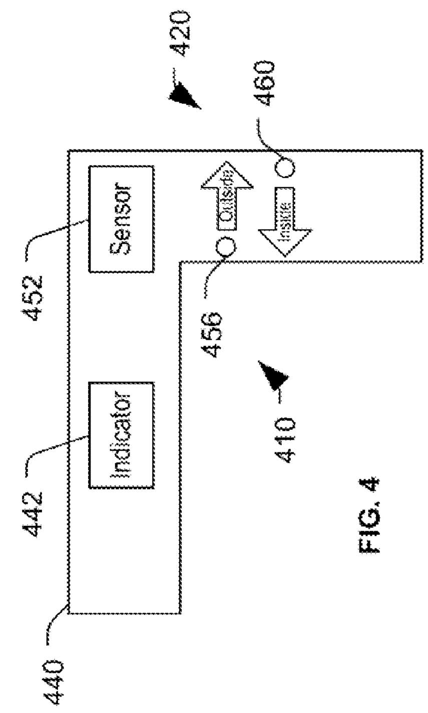
FIG. 4 is an illustration of a third example of an alignment tool.

FIG. 4 is an illustration of a third example of an alignment tool, which is a particular angle measurement tool commonly referred to as a "square" 440. The square 440 may include an inside measurement area 410 to measure whether an outside angle of a work piece is substantially square, and an outside measurement area 420 to measure whether an inside angle of the work piece is substantially square. The square 440 may include one or more inputs 456, 460 to select whether the inside measurement area 410 or the outside measurement area 420 is to be used to indicate the aligned state. In a particular embodiment, the square 440 automatically indicates the aligned state when either of the measurement areas 410, 420 indicates alignment. The square 440 also include a sensor 452 that is adapted to determine whether the square 440 is in the aligned state (e.g., whether a measured angle of the work piece is substantially square). To illustrate, surfaces of the inside measurement area 410 may be pressure or contact sensitive. When all of or a substantial portion of the surfaces of the inside measurement area 410 are in contact with the work piece, the sensor 452 may determine that the square 440 is in the aligned state. Similarly, surfaces of the outside measurement area 420 may be pressure or contact sensitive. When all of or a substantial portion of the surfaces of the outside measurement area 420 are in contact with the work piece, the sensor 452 may determine that the square 440 is in the aligned state.

In a particular embodiment, the square 440 may include an indicator 442. The indicator 442 may indicate whether the square 440 is in the aligned state. The indicator 442 may also, or in the alternative, indicate an adjustment that should be made to the work piece to bring the square 440 into alignment. To illustrate, the indicator 442 may indicate whether the measured angle of the work piece is an obtuse angle or an acute angle.

While FIGS. 2-4 have illustrated several specific examples of alignment tools, other alignment tools are also envisioned. For example, the alignment tool may include a length or distance measurement device, such as a tape measure, a ruler, depth gauge, a thickness gauge, calipers, a laser distance measurement tool, or any other device that can be used to measure length or distance. In this example, the length measurement device may include an input to specify an alignment length. The alignment length refers to the length that, when measured by the length measurement device, will indicate alignment of the length measurement device. To illustrate, when a fastener is to be driven 16 inches from a particular point, the alignment length of the length measurement device can be set to 16 inches (e.g., using an input device, such as the input device 156 of FIG. 1). The length measurement device may then be used to measure the alignment length, and when the alignment length is measured, the length, measurement device may indicate the aligned state. An engagement state of a selective drive system of a portable handheld tool, such as the portable handheld tool 100 of FIG. 1, may be selected based on the indication of the aligned state.

Figure 5A:
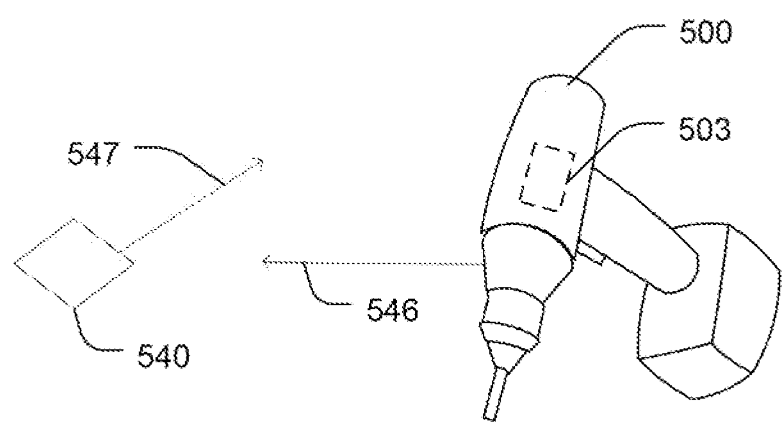
FIGS. 5A and 5B illustrate a first particular embodiment of interaction of tools of an interactive tool set.
Figure 5B:
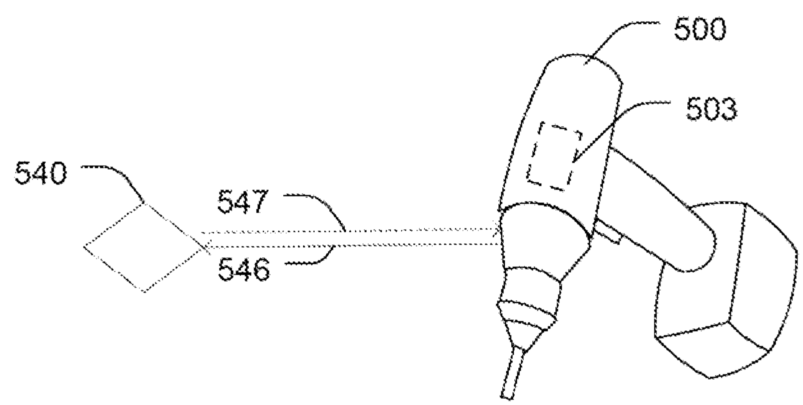

FIGS. 5A and 5B illustrate a first particular embodiment of interaction of tools of an interactive tool set. In FIGS. 5A and 5B, a portable handheld tool, e.g., a drill 500, interacts with one or more alignment tools, such as an alignment tool 540.

The alignment tool 540, the drill 500, or both, send a signal 546 that is used to determine whether the drill 500 is aligned with the alignment tool 540. For example, the alignment tool 540 may include a light sensor and the drill 500 may project a laser beam. When the alignment tool 540 detects the laser beam, the alignment tool 540 may indicate the aligned state. In another example, the drill 500 may include a sensor that detects the laser beam and the alignment tool 540 may include a retro-reflector or other device that sends the laser beam back toward the drill 500 (as illustrated by reflected beam 547 in FIG. 5B) when the drill 500 and the alignment tool 540 are in the aligned state.

The drill 500 may include a selective drive system 503, such as the selective drive system 102 of FIG. 1. When the aligned state is achieved, as illustrated in FIG. 5B, the selective drive system may enable use of the drill 500 to drill a hole. In this configuration, the alignment tool 540 may be a passive device, and thus may be greatly simplified. However, in this configuration, the alignment tool 540 does not take active measurements, and thus functionality of the alignment tool 540 may be limited as compared to "active" alignment tools (i.e., alignment tools that make measurements, such as the level 240, the angle measurement tool 340, the square 440, length measurement tools, or other tools that make active measurements).

Figure 6A:
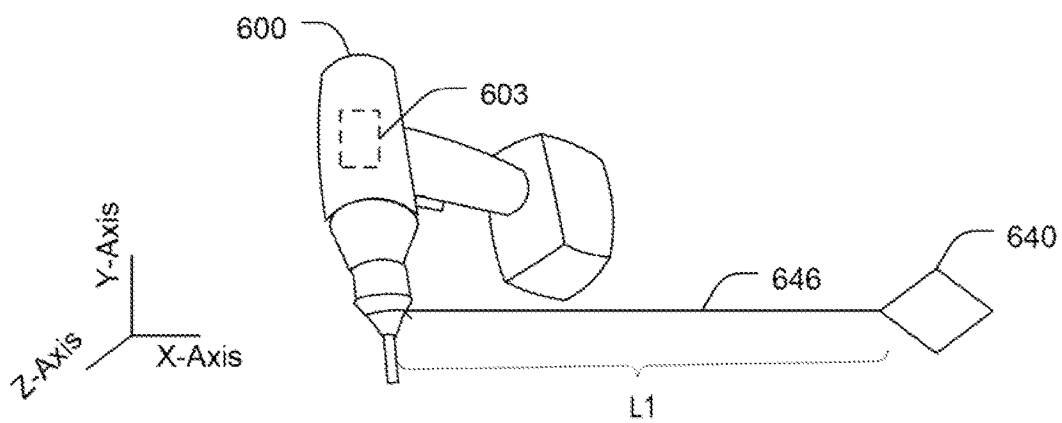
FIGS. 6A-6C illustrate a second particular embodiment of interaction of tools of an interactive tool set.
Figure 6B:
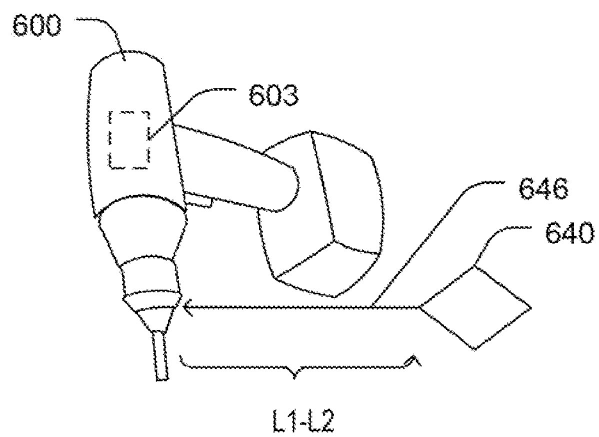
Figure 6C:
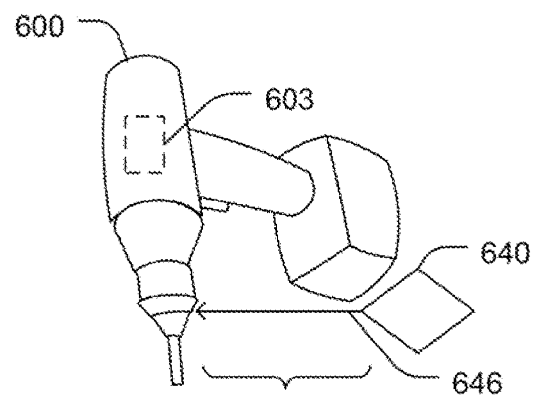

FIGS. 6A-6C illustrate a second particular embodiment of interaction of tools of an interactive tool set. In FIG. 6A-6C, a portable handheld tool, e.g., a drill 600, interacts with one or more alignment tools, such as an alignment tool 640.

The alignment tool 640, the drill 600, or both, send a signal 646 that is used to determine whether the drill 600 is aligned with the alignment tool 640. In the particular example of FIGS. 6A-6C, the alignment tool 640 is a length measurement device that uses the signal 646 to determine distance between the drill 600 and the alignment tool 640. To illustrate, the signal 646 may be a laser beam that the alignment tool 640 (or the drill 600) uses to determine distance (along an x-axis direction). Additionally, since the laser beam is directional, the laser beam may also be used, to determine alignment direct-tonally in a y-axis or x-axis direction.

In an illustrative embodiment, the alignment tool 640 projects the signal 646 toward the drill 600. When the drill 600 is aligned with the alignment tool 640 along the y-axis, the z-axis, or both, the drill 600 reflects the signal 646 back to the alignment tool 640, which uses the reflected signal 646 to determine a distance between the drill 600 and the alignment tool 640. In another illustrative embodiment, the drill 600 projects the signal 646 toward the alignment tool 640. When the drill 600 is aligned with the alignment tool 640 along the y-axis, the z-axis, or both, the alignment tool 640 reflects the signal 646 back to the drill 600, which uses the reflected signal 646 to determine a distance between, the drill 600 and the alignment tool 640.

The alignment state of the drill 600 and the alignment tool 640 may be determined based on the alignment, along the y-axis and the z-axis as well as distance along the x-axis. The drill 600 may include a selective drive system 603, such as the selective drive system 102 of FIG. 1. When the aligned state is achieved, such as when the drill 600 is a distance L1 from the alignment tool 640, as illustrated in FIG. 6A, the selective drive system 603 may enable use of the drill 600 to drill a hole or to drive a fastener. Additionally or in the alternative, the aligned state may be determined based on a difference between two positions. For example, as illustrated in FIG. 6B, the aligned state may be determined when the drill is a second distance, L2, closer to the alignment tool 640. To illustrate, to position multiple, equally spaced holes, the alignment state may be determined each time the drill 600 moves the distance L2 relative to the alignment tool 640. Thus, as illustrated in FIG. 6C, when the drill 600 moves to a position L1-L2-L2, the alignment state may again be indicated.

Figure 7A:
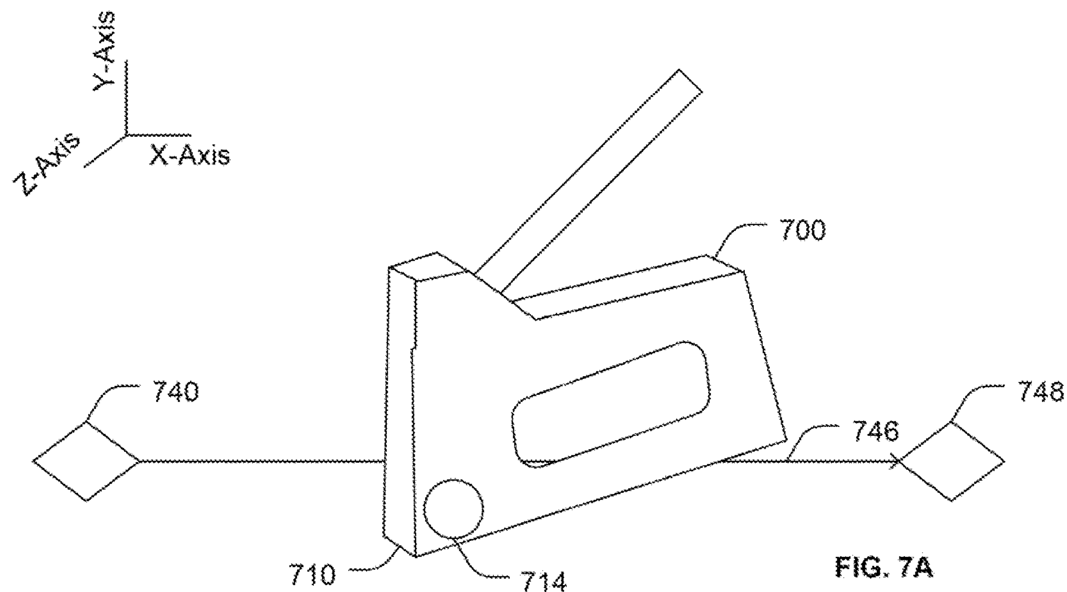
FIGS. 7A and 7B illustrate a third particular embodiment of interaction of tools of an interactive tool set.
Figure 7B:
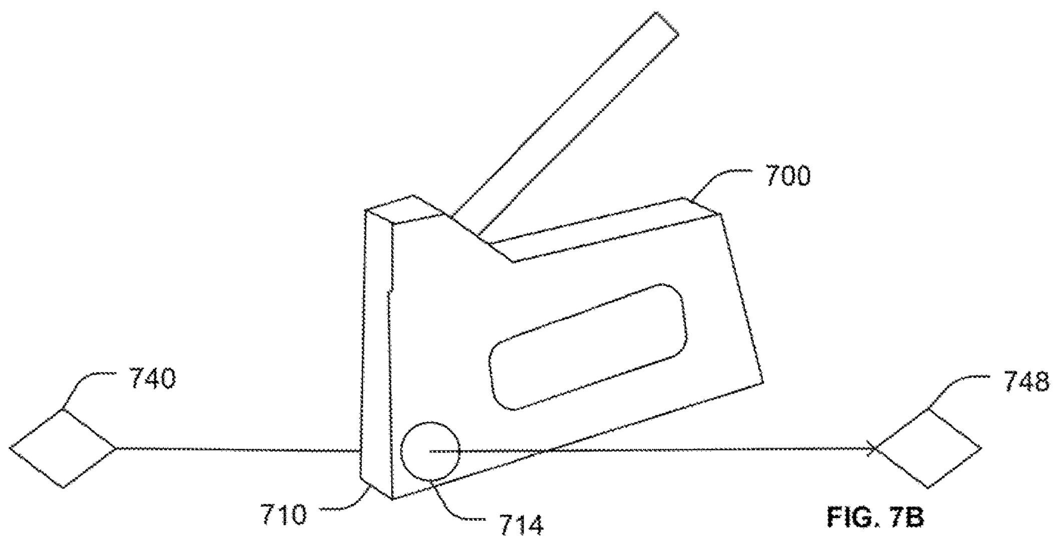

FIGS. 7A and 7B illustrate a third particular embodiment of interaction of tools of an interactive tool set. As illustrated in FIGS. 7A and 7B, a portable handheld tool may drive fasteners that are directional (i.e., that are not radially symmetrical, but rather have a different length than width), such as a stapler 700 that drives staples. The stapler 700 may interact with one or more alignment tools 740, 748 to determine when the stapler 700 is in an aligned state relative to the alignment tools 740, 748. For example, the stapler 700 may have one or more sensors 714 to detect a signal 746 (such as a laser beam) from the alignment tools 740, 748 to determine when the stapler 700 is aligned with the alignment tools 740, 748, which may include, for example, alignment along a y-axis and a z-axis, distance along an x-axis, rotation about the y-axis or z-axis, or any combination thereof. When the aligned state is indicated, a drive head 710 of the stapler 700 may be engaged by a selective drive system, such as the selective drive system 102 of FIG. 1. When the drive head 710 is engage, the stapler 700 may drive a staple responsive to a user attempting to drive a staple (e.g., depressing a handle of the stapler 700).

Figure 8:
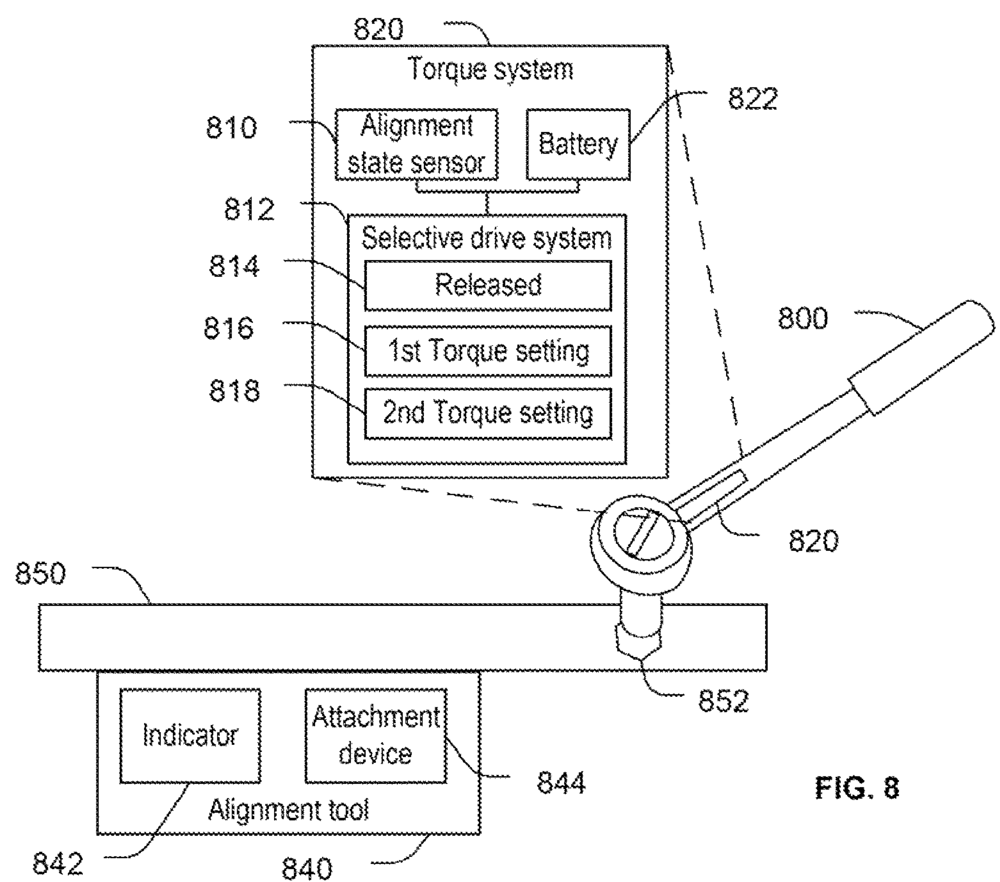
FIG. 8 is an illustration of a second particular embodiment of an interactive tool set.

FIG. 8 is a block diagram of a second particular embodiment of an interactive tool set. The interactive tool set includes a ratchet 800, which is a type of portable handheld tool that may be used to a drive fastener 852, such as a bolt. The ratchet 800 may interact with an alignment tool 840 to determine alignment of a work piece 850. For example, the alignment tool 840 may indicate an aligned state when the work piece 850 is level (or at another aligned position).

The alignment tool 840 may include an attachment device 844 to enable the alignment tool 840 to determine the aligned state without requiring a user to hold the alignment tool 840 or without requiring the user to fully support or hold the alignment tool 840. The alignment tool 840 may include an indicator 842. The indicator 842 may indicate when the aligned state is achieved, a direction or distance that the work piece 850 should be moved to reach the aligned state.

The ratchet 800 may include a torque system 820. The torque system 820 may include an alignment state sensor 810 to detect when the alignment tool 840 indicates the aligned state. The torque system 820 may also include a selective drive system 812. The selective drive system 812 may be operable to select between two or more drive states. For example, the selective drive system 812, when disabled, may cause the ratchet 800 to behave like an ordinary ratchet (e.g., to drive fasteners regardless of the aligned state of the alignment tool 840). When the selective drive system 812 is enabled, the selective drive system 812 may cause the ratchet 800 to select a drive state based on the aligned state of one or more alignment tools, such as the alignment tool 840.

In a particular embodiment, the selective drive system 812 includes a first selectable drive state, release state 814, in which a drive head of the ratchet 800 is not operable. For example, when the alignment tool 840 indicates that the work, piece 850 is not aligned (e.g., not level), the selective drive system 812 may select the release state 814. When the release state 814 is selected, the ratchet 800 will not drive the fastener 852.

The selective drive system 812 may also include a second selectable drive state, e.g., a first torque setting 816, in which the drive head of the ratchet 800 releases (i.e., becomes inoperable) when a first torque setting is reached. For example, when the alignment tool 840 indicates that the work piece 850 is at a first aligned state, such as nearly aligned (e.g., nearly level), the selective drive system 812 may select the first torque setting 816.

The selective drive system 812 may also include a third selectable drive state, a second torque setting 818. In which the drive head of the ratchet 800 releases (i.e., becomes inoperable) when a second torque setting 818 is reached or does not release responsive to applied torque. For example, when the alignment tool 840 indicates that the work piece 850 is at a second aligned state, such as substantially aligned (e.g., level), the selective drive system 812 may select the second torque setting 818. The ratchet 800 may also include a battery 822 that provides power for the torque system 820.

In the embodiment described above, the user may partially tighten the fastener 852 when the work piece 850 is nearly level. In particular, the ratchet 800 may select the first torque setting 816 to enable the fastener 852 to be partially driven, but not fully tightened. The alignment tool 840 may indicate, via the indicator 842, which way to adjust the work piece 850 to achieve an aligned state. When the work piece 850 is level, the alignment tool 840 indicates an aligned state and the ratchet 800 selects the second torque setting 818 to enable the fastener to be fully tightened.

Figure 9:
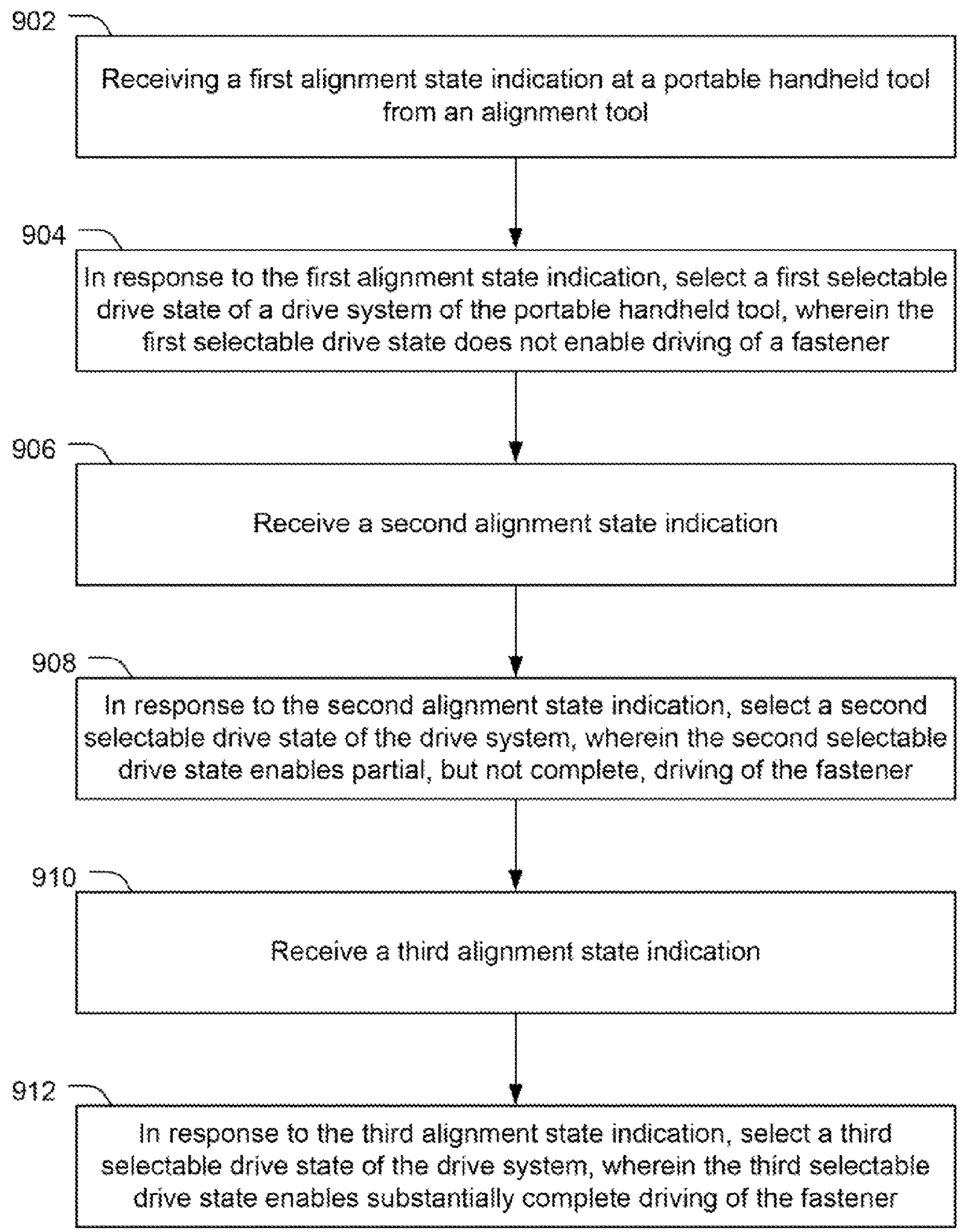
FIG. 9 is a flow chart of a particular embodiment of a method of interaction among tools of an interactive tool set.

FIG. 9 illustrates a flow chart of a method according to a particular embodiment. The method includes, at 902, receiving a first alignment state indication at a portable handheld tool from an alignment tool. For example, the portable handheld tool 100 may receive the alignment state indication via the wireless signal 146 from the alignment tool 140, as illustrated in FIG. 1. The method also includes, at 904, in response to the first alignment state indication, selecting a first selectable drive state of a drive system of the portable handheld tool, wherein the first selectable drive state does not enable driving of a fastener. For example, when the first alignment state indication indicates that the alignment tool (and therefore a work piece) is not in alignment, the portable handheld device may be disabled, locked or otherwise not operable.

The method also includes, at 906, receiving a second alignment state indication, and, at 908, in response to the second alignment state indication, selecting a second selectable drive state of the drive system, wherein the second selectable drive state enables partially, but not completely, driving the fastener. For example, when the alignment tool indicates that it is nearly in alignment (e.g., within a threshold of alignment) the portable handheld tool may be enabled to partially drive the fastener. To illustrate, a speed or torque limit of the portable handheld tool may be set to enable the user to partially drive the fastener.

The method may also include, at 910, receiving a third alignment state indication, and, at 912, in response to the third alignment state indication, selecting a third selectable drive state of the drive system. The third selectable drive state enables substantially completely driving the fastener. For example, when the alignment tool indicates that it is substantially aligned (e.g. within a second threshold of alignment), the portable handheld tool may be enabled to fully or substantially fully (e.g., up to a limit of the portable handheld tool) drive the fastener. To illustrate, the speed or torque limit of the portable handheld tool may be removed or set to a higher limit to enable the user to substantially fully drive the fastener.

Various portable handheld tools have been discussed by way of example and are not intended as limitations. In various embodiments, the portable handheld tools may include any portable, handheld device that is capable of driving a fastener. Similarly, various alignment tools have been described by way of example and are not intended as limitation. In various embodiments, the alignment tools may include any device that is capable of taking a measurement or generating an output responsive to a measurement that indicates position of a work piece or a relative position of the alignment tool and the portable handheld tool. In certain embodiments, tools other than alignment tools may be used. For example, measurement tools such as pressure measurement tools, moisture measurement tools, light detection tools, or tools to take other measurements.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rafter than restrictive. The drawings are not to scale.

Moreover, although specific embodiments have been illustrated and described herein, it should be appreciated that any subsequent arrangement designed to achieve the same or similar results maybe substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method comprising:

receiving a first alignment state indication at a portable handheld tool from an alignment tool, the first alignment state indication indicating an alignment state of a workpiece relative to a reference that is independent and distinct from the portable handheld tool;

based on the first alignment state indication, enabling a first selectable drive state of a drive system of the portable handheld tool; and actuating the drive system, responsive to user input, wherein the drive system is limited based on the first selectable drive state.

2. The method of claim 1, further comprising:

receiving a second alignment state indication at the portable handheld tool from the alignment tool, the second alignment state indication indicating a second alignment state of the workpiece relative to the reference that is independent and distinct from the portable handheld tool;

in response to the second alignment state indication, selecting a second selectable drive state of the drive system; and actuating the drive system responsive to user input, wherein the drive system is limited based on the second selectable drive state, and wherein the second selectable drive state limits the drive system differently than the first selectable drive state.

3. The method of claim 2, wherein the first selectable drive state enables fully driving a fastener and the second alignment state only enables partially driving the fastener.

4. The method of claim 2, wherein, when the first selectable drive state is engaged the portable handheld tool is operable to a first torque threshold, and, when the second selectable drive state is engaged, the portable handheld tool is operable to a second torque threshold, the second torque threshold higher than the first torque threshold.

5. The method of claim 2, wherein, when the first selectable drive state is engaged the portable handheld tool is operable to a first maximum rate, and, when the second selectable drive state is engaged, the portable handheld tool is operable to a second maximum rate, the second maximum rate higher than the first maximum rate.

6. The method of claim 1, further comprising:

receiving a second alignment state indication at the portable handheld tool from the alignment tool, the second alignment state indication indicating a second alignment state of the workpiece relative to the reference that is independent and distinct from the portable handheld tool; and in response to the second alignment state indication, selecting a second selectable drive state of the drive system;

wherein the drive system is inoperable in the second selectable drive state limits.

7. The method of claim 1, wherein the alignment tool comprises a level measurement device and wherein the alignment state indicates whether the workpiece is substantially level.

8. The method of claim 1, wherein the alignment tool comprises a length measurement device and wherein the alignment state indicates whether the workpiece is substantially at a predetermined location relative to the reference.

9. The method of claim 1, further comprising:

receiving a second alignment state indication at the portable handheld tool from a second alignment tool, the second alignment state indication indicating a second alignment state of the workpiece relative to a second reference that is independent and distinct from the portable handheld tool; and in response to the second alignment state indication, enabling a second selectable drive state of the drive system, wherein the drive system is limited based on the second selectable drive state, and wherein the second selectable drive state limits the drive system differently than the first selectable drive state.

10. The method of claim 1, wherein the alignment tool comprises an angle measurement device, wherein the alignment state indicates whether the workpiece is at a particular angle relative to the reference.

11. The method of claim 1, wherein the portable handheld tool comprises a drill/driver device.

12. The method of claim 1, wherein the first alignment state indication is a wireless signal sent by the alignment tool.

13. The method of claim 12, wherein, the wireless signal comprises a human audible tone that indicates the alignment state to the portable handheld tool and indicates to a user that the drive system is engaged.

14. The method of claim 1, further comprising, responsive to the first alignment state indication, generating a human detectable signal at the portable handheld tool, the human detectable signal indicating at least one of the alignment state or a drive state of the drive system.

15. A method comprising:

detecting, by an alignment tool an alignment state of a workplace relative to a reference; and generating a wireless signal indicating the alignment state, wherein, a portable handheld tool selects a drive state of a selective drive system of the portable handheld tool based on the wireless signal, wherein the alignment toot is independent and distinct from the reference and is independent and distinct from the portable handheld tool.

16. The method of claim 15, wherein the wireless signal is a human perceptible signal.

17. The method of claim 15, wherein when the selective drive system is in a first drive state, the portable handheld tool is operable to perform a function in response to a user input, and, when the selective drive system is in a second drive state, the portable handheld tool is not operable to perform the function in response to the user input.

18. The method of claim 17, wherein the function includes driving a fastener.

19. The method of claim 17, wherein the function includes driving a fastener to a first threshold torque, wherein in the second drive state, the portable handheld tool is operable to drive the fastener to a second threshold torque but not to the first threshold torque, wherein the second threshold torque is less than the first threshold torque.

20. The method of claim 17, wherein, the function includes driving a fastener up to a first threshold speed, wherein in the second drive state, the portable handheld tool is operable to drive the fastener up to a second threshold speed but not to the first threshold speed, wherein the second threshold speed is less than the first threshold speed.

* * * * *